May 10, 1927.  1,628,394
B. B. DE MONTMORENCY
COFFEE RETAINER FOR URNS
Filed Aug. 1, 1925
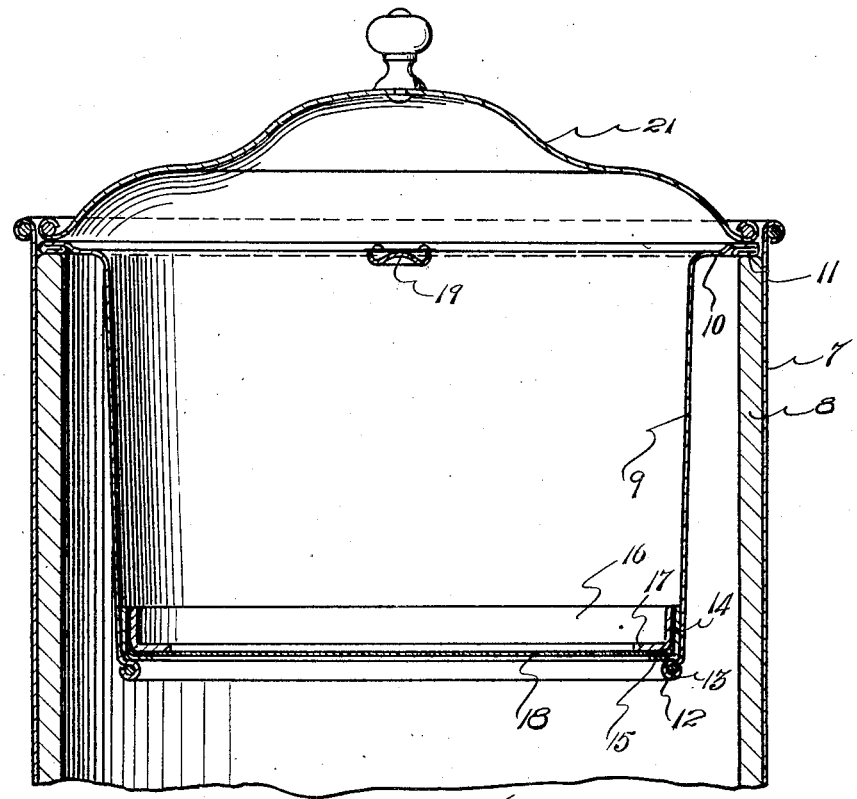
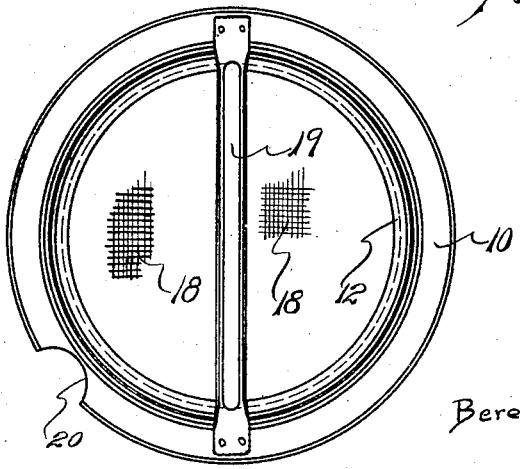
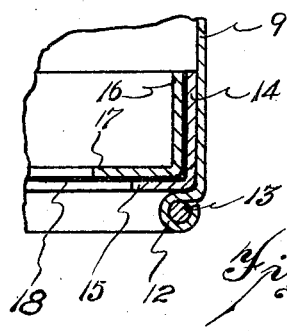
INVENTOR.
Beresford B. de Montmorency,
BY
ATTORNEY.

Patented May 10, 1927.

1,628,394

UNITED STATES PATENT OFFICE.

BERESFORD B. DE MONTMORENCY, OF DETROIT, MICHIGAN.

COFFEE RETAINER FOR URNS.

Application filed August 1, 1925. Serial No. 47,438.

My invention relates to a new and useful improvement in a coffee retainer adapted for use with coffee urns in which the coffee is placed in a retainer and the water poured thereover. With coffee urns of this class there is now commonly used a sack having a ring along one edge to retain it in distended position and serve as a supporting member for the sack. The water is then poured into the urn so as to pass over the coffee. On account of the porous end of the sack, the water is permitted to pass through the sack without being forced to pass over the coffee so that a constant repouring of the water on the coffee is required thus lessening the efficiency of the urn for making coffee. With a retainer of this class which is porous on its sides, the full strength of the coffee is not used as all of the coffee is not properly brought into contact with the water poured thereon. To overcome this objectionable feature is an object of the present invention inasmuch as the sides of the retainer being imperforate to the water, the water is forced, in order to pass into the urn, to pass through the coffee itself which is placed in the retainer.

It has been found through experience that with the use of a coffee retainer such as the present invention embodies, the necessity of repouring the water over the coffee is obviated. The coffee may also be ground finer on account of the very fine mesh of the sieve or screen member which is used with the retainer. With the present invention it has been found that the amount of coffee bean necessary to produce a gallon of coffee may be reduced from eight to six or six and one-half ounces, this saving in the amount of bean used resulting from the finer grinding and from the directing of the water directly through the coffee in a single pouring.

Another object of the invention is a provision of a coffee retainer which will be simple in structure, economical of manufacture and highly efficient in use.

The efficiency and economy of the device results from the peculiar structure of the retainer. The cloth which is used as a screening member or sieve may be of a very fine quality and of a close mesh. Although the cloth is of a poorer quality than the cloth now customarily used for coffee sacks, an economy results in its use inasmuch as the cloth may be quickly and easily washed while in distended position so that while the washing is more thorough and the cleansing better, the wear on the screen member is less. The efficiency results from the non-clogging of the screen member inasmuch as filter paper or perforated member will clog.

Other objects will appear hereinafter.

The invention consists in the combination and arrangement of parts hereinafter described and claimed.

The invention will be best understood from a reference to the accompanying drawings which form a part of this specification.

As shown in the drawings, the urn with which the present invention is used comprises a metallic cylindrical member 7 insulated with a porcelain member 8.

The present invention comprises a coffee retainer having imperforate side walls 9 made preferably cylindrical and slightly tapered inwardly at the lower end. The portion of upper wall 9 is provided with an outwardly extended flange 10 which is doubled upon itself at the edge 11 and adapted to rest on the upper edge of the member 8 retaining the main body 9 slightly spaced over the inner surfaces of the insulated member 8. The lower end of the main body 9 is curled upon itself to form a bead 12 which projects inwardly of the main body 9, a slight flange being provided for effecting this inward projection. The bead 12 is reinforced by a suitable wire 13 projected therethrough. A ring 14 having an angularly turned inwardly directed portion 15 is adapted for mounting in the body 9, this ring 14 being inclined to the angularly turned portion 15, slightly, to conform with the taper of the main body 9. A co-operative ring 16 tapered similarly to the ring 14 and having an inwardly projecting portion 17 is provided and adapted for engaging in the ring 14 so as to clamp securely in tightly stretched condition the sieve or screen member 18. This sieve or screen member 18 is preferably made from cloth of a good quality and a very fine mesh.

When the cloth is being mounted between the rings 14 and 16 the cloth is stretched over the ring 14, and the ring 16 pressed firmly into the ring 14, the clearance between these rings being small so as to firmly clamp the cloth therebetween. By mounting the cloth between the rings in this manner, the main body is held in taut condition.

After mounting the cloth between the rings, the rings are then inserted in the main body of the container 9 as shown in Fig. 1, the bead 12 serving to support these rings. It will be noted that the angularly turned portion 17 is considerably longer than the angularly turned portion 15. When it is desired to remove the cloth, the user presses the angularly turned portion 17 with the thumbs while holding the ring 14 at its edge with the fingers.

When it is desired to clean the cloth 18 after use, the rings may be removed from the container 9 and the cloth 18 washed thoroughly while locked by the rings. The thorough cleaning of the cloth 18 is effected by directing a stream of water through it while in its taut condition. The coffee oils adhering to the cloth 18 may be also easily and quickly removed by directing a stream of hot water through the ring or cloth 18.

The main body 9 is provided with a diametrically extended handle 19 which is secured at its opposite ends to the flange 10. As shown in Fig. 2 one side of the flange 10 is cut away as at 20 to provide a clearance for the inwardly projecting water pipe which is used for furnishing the urn with water, this water being directed through the coffee.

If desired, the rings 14 and 16 may be dispensed with and a ring provided to clamp around the periphery of the lower end of the container so as to exteriorly hold the cloth 18 in position. When it is desired to remove the container from the urn, the handle 19 may be grasped by the user and quickly and easily removed from the urn. A lid 21 is provided for the urn in the usual manner.

While I have illustrated and described the preferred form of structure I do not wish to limit myself to the precise details of structure set forth but desire to avail myself of such variations and modifications as come within the scope of the appended claim.

Having thus described my invention, what I claim as new and desire to secure by Letters Patent is:

A coffee retainer of the class described adapted for use with coffee urns comprising: an imperforate sleeve forming member; supporting means on the upper end of said sleeve forming member adapted for engaging said urn and supporting said sleeve therein; an inwardly projecting flange on the lower end of said sleeve, said flange being curled to form an inwardly offset bead; a clamping ring having an inwardly directed flange at its lower end, said flange being adapted for resting on the upper surface of said beaded flange of said sleeve; a co-operating clamping ring adapted for positioning within said first mentioned clamping ring; an inwardly directed flange on said co-operating ring, said flange being of greater length than the flange on said first mentioned clamping ring; and a porous member clamped between said rings and extending across the opening therein for forming a closure for the lower end of said sleeve.

In testimony whereof I have signed the foregoing specification.

BERESFORD B. de MONTMORENCY.